(12) United States Patent
Bonaventure et al.

(10) Patent No.: US 12,214,735 B2
(45) Date of Patent: Feb. 4, 2025

(54) TRIM ELEMENT COMPRISING A COATING LAYER ATTACHED IN A GROOVE OF A SUPPORT

(71) Applicant: FAURECIA INTERIEUR INDUSTRIE, Nanterre (FR)

(72) Inventors: Franck Bonaventure, Belloy en France (FR); Jean-Pierre Morel, Boissy L'Aillerie (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 295 days.

(21) Appl. No.: 17/895,475

(22) Filed: Aug. 25, 2022

(65) Prior Publication Data

US 2023/0062920 A1    Mar. 2, 2023

(30) Foreign Application Priority Data

Aug. 25, 2021 (FR) ...................................... 2108903

(51) Int. Cl.
*B60R 13/02* (2006.01)

(52) U.S. Cl.
CPC .................................... *B60R 13/02* (2013.01)

(58) Field of Classification Search
CPC . B60R 13/02; B60R 13/0212; B60R 13/0273; B60R 13/0243; B60R 13/0256; B60R 13/0262; B60R 2013/0293
See application file for complete search history.

(56) References Cited

U.S. PATENT DOCUMENTS

| 4,779,390 A | 10/1988 | Repper et al. |
| 7,100,958 B2 * | 9/2006 | Ory ........................ B60R 13/02 296/70 |
| 2008/0006194 A1 * | 1/2008 | Morita ..................... B60N 2/78 112/475.04 |

FOREIGN PATENT DOCUMENTS

| JP | 2003246243 A | 9/2003 |
| JP | 2005 53435 | * 3/2005 |

OTHER PUBLICATIONS

French Search Report for FR 2108903 dated May 11, 2022, 2 pages.

* cited by examiner

*Primary Examiner* — Joseph D. Pape
(74) *Attorney, Agent, or Firm* — Reising Ethington P.C.

(57) ABSTRACT

A trim element includes a support comprising a groove delimited by a first wall and a second wall, and a first covering layer having at least one edge received in the groove. The trim element further includes a retention device for retaining the edge of the first covering layer in the groove, the retention device having a supporting element extending at least partly into the groove and applying a part of the outer face of the edge of the first covering layer against the second wall of the groove, with the first covering layer covering the groove from the first wall to the second wall.

17 Claims, 5 Drawing Sheets

TRIM ELEMENT COMPRISING A COATING LAYER ATTACHED IN A GROOVE OF A SUPPORT

TECHNICAL FIELD

The present invention relates to a vehicle trim element, of the type comprising:
- a support comprising at least one groove extending in a recessed manner from an outer surface of the support, said groove being delimited by a first wall and a second wall spaced from each other,
- at least one first covering layer comprising an inner face extending over a first portion of said support and an outer face, opposite the inner face, said first covering layer comprising at least one edge defining a portion of the periphery of the first covering layer, said edge being received in the groove of the support, the inner face of the edge of the first covering layer extending opposite the first wall of the groove and the outer face of the edge of the first covering layer extending opposite the second wall of the groove.

The invention applies, for example, to a trim element forming a dashboard, door panel, centre console or the like, for lining the passenger compartment of a vehicle.

BACKGROUND

Such a trim element generally comprises a support, giving the trim element its shape and rigidity, coated with at least one covering layer, giving the trim element its look and feel.

In some cases, at least two covering layers, e.g. with different appearances, may be provided to cover different parts of the substrate. In this case, in order to give a pleasing appearance to the transition between the two covering layers, it is, for example, provided that the adjacent edges of the two covering layers are introduced into a groove in the substrate, causing the transition to appear as curved parts of the covering layers at the point where they are introduced into the groove. The smaller the radius of curvature of the curved parts, the more the transition between the two covering layers will appear to be a line between the two covering layers. Conversely, the greater the radius of curvature, the more the transition will appear as a recess extending between the two covering layers, and the greater the depth of the recess, the greater the radius of curvature, which may detract from the appearance of the trim element at the transition.

When the two covering layers are of the same nature and have a similar thickness, it is possible to achieve sufficiently small radii of curvature to ensure a satisfactory-looking transition.

However, when only part of the substrate is coated with a covering layer and the other part is left bare, or when one of the covering layers has a much smaller thickness than the other covering layer, the radius of curvature of the thicker covering layer is enlarged so that the covering layer occupies substantially the entire groove, and the appearance of the trim element looks worse in the groove. In addition, a gap appears between the outer face of the covering layer and an edge of the groove, which further reduces the perceived quality at the transition.

To overcome this, it could be considered to reduce the width of the groove to match the thickness of the covering layer. However, this makes it more difficult to produce the trim element. Furthermore, this is not always possible due to the constraints of the support-making tool, especially when the support is made by compression, as the groove must have a certain minimum width, which is usually greater than the width of the covering layer.

SUMMARY

One of the aims of the invention is to overcome these disadvantages by providing a trim element with a satisfactory appearance even when only part of the substrate is coated with a covering layer or when the covering layers are of different kinds.

To this end, the invention relates to a trim element of the aforementioned type, comprising a device for retaining the edge of the first covering layer in the groove of the support, said retention device comprising at least one supporting element extending at least partly into the groove and applying a part of the outer face of the edge of the first covering layer against the second wall of the groove, the first covering layer covering the groove from the first wall to the second wall.

The retaining element allows the first covering layer to fill the groove, even when the thickness of the first covering layer is much less than the width available in the groove, measured between the first and second walls or between the first wall and the outer face of a second covering layer, one edge of which is also received in the groove. Thus, the radius of curvature of the curved portion of the first covering layer, extending where the first covering layer dips into the groove, can be reduced and the depth of the recess extending between the outer face of the first covering layer and the second wall of the groove or the outer face of the other covering layer can also be reduced. Thus, the appearance of the trim element is satisfactory, especially at the periphery of the first covering layer at the groove.

The trim element according to the invention may comprise one or more of the following features, taken alone or in any combination that is technically possible:
- the first part of the support is adjacent to the first wall of the groove, the support comprising a second part adjacent to the second wall of the groove,
- the trim element comprises a second covering layer, different in nature from the first covering layer, an inner face of said second covering layer extending over the second part of the support, the second covering layer comprising an edge defining a part of the periphery of the second covering layer, said edge being received in the groove, the inner face of the edge of the second covering layer extending over the second wall of the groove, the supporting element of the retention device applying a portion of the outer face of the edge of the first covering layer against an outer face of the edge of the second covering layer, opposite to the inner face of the second covering layer,
- the sum of the thicknesses of the edges of the first covering layer and second covering layer is less than the width of the groove,
- the supporting element comprises an anchor leg extending substantially parallel to the first and second walls of the groove and being arranged to hold the edge of the first covering layer in said groove, the supporting element comprising a support leg extending from one end of said anchor leg in a direction from the first wall to the second wall of the groove, the first covering layer being folded around said support leg,
- the edge of the first covering layer is folded around the anchor leg of the retention element, the retention device further comprises a profile for retaining the edge of the first covering layer in the groove, said retention profile defining a housing delimited by two side walls applied respectively against the first wall and the second wall of the groove, the edge of the first covering layer being held in said housing, the anchor leg is received in said housing and locks the edge of the first covering layer in said housing, the side wall of the retaining profile, which rests on the first wall of the groove, is formed by the anchor leg of the retaining element, the retaining profile and the retaining element being portions of the same part, at least one side wall of the retention profile comprises at least one rib extending from said side wall outside the housing between said side wall and the corresponding wall of the groove, said rib anchoring the retention profile in the groove.

BRIEF DESCRIPTION OF THE DRAWINGS

Other aspects and advantages of the invention will become apparent upon reading the following description, given as an example and referencing the attached drawings, in which.

Figure 1:
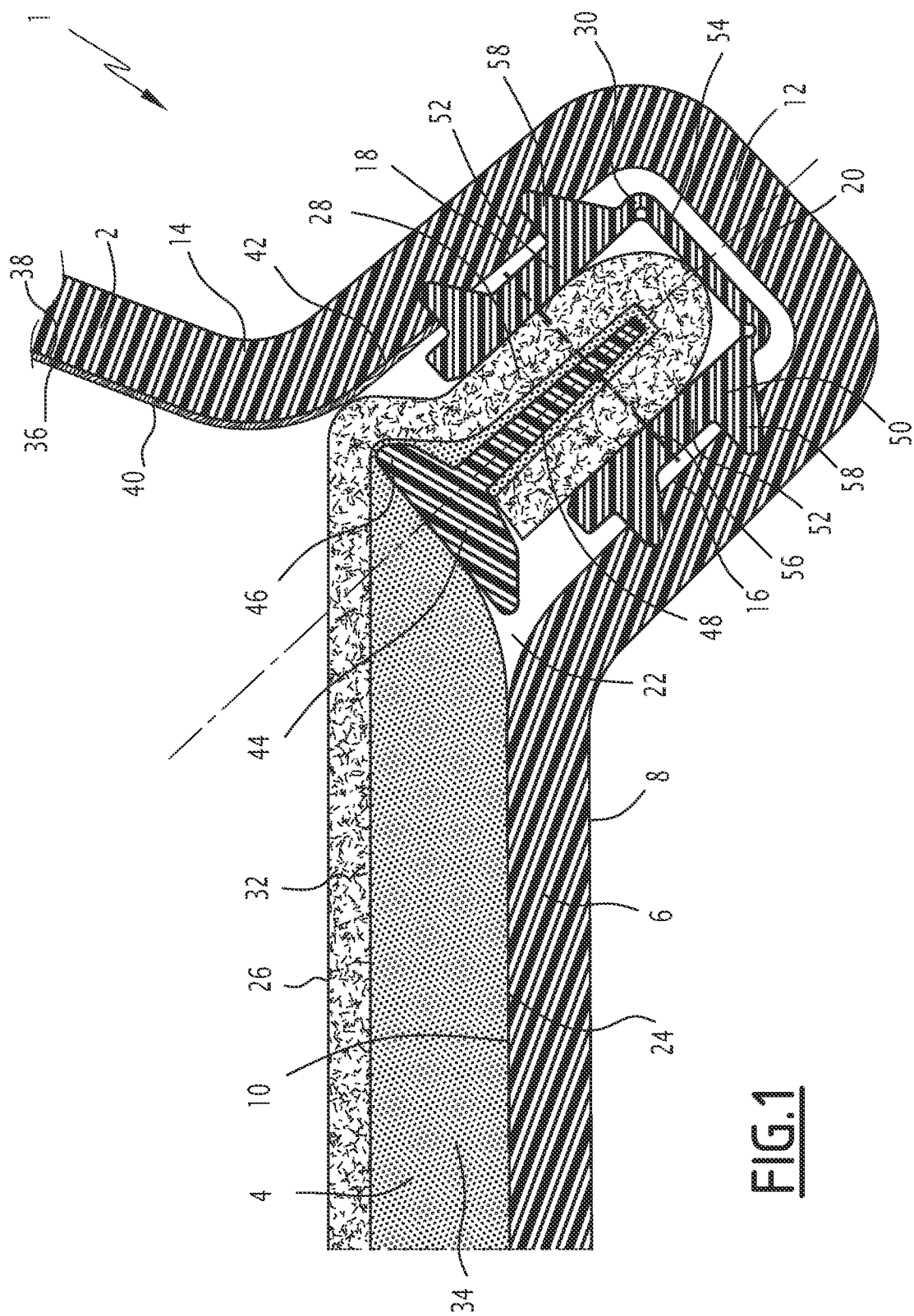
FIG. 1 is a schematic cross-sectional representation of a portion of a trim element according to one embodiment of the invention.

With reference to the figures, a vehicle trim element 1 comprising a support 2 and at least one covering layer 4 extending over a first portion 6 of the support 2 is described. Such a trim element 1 is intended to be mounted on a vehicle part and to extend into the passenger compartment of the vehicle.

DETAILED DESCRIPTION

In the description, the terms "internal" and "interior" refer to elements facing the part of the vehicle on which the trim element 1 is intended to be mounted and the terms "external" and "exterior" refer to elements that face the passenger compartment of the vehicle.

The support 2 is formed by a body having the shape of at least part of the trim element and for example made of a substantially rigid material. In this way, the support 2 imparts its shape and rigidity to at least part of the trim element. The support 2 may have any desired shape, such as a three-dimensional shape, depending on the nature of the trim element.

In one embodiment, the support 2 is made of a composite material comprising natural fibres in a polypropylene matrix, also known as NFPP for "Natural Fibre PolyPropylene". The natural fibres are, for example, selected from flax, hemp, kenaf and/or wood. The support 2 is formed, for example, by thermo-compression in a pressing tool with the desired shape of the support 2, which corresponds to the shape of at least part of the trim element 1. Alternatively, the support 2 can be made of other materials, for example injected thermoplastic, such as injected polypropylene, possibly filled with mineral or natural fibres.

The support 2 comprises an inner surface 8 and an outer surface 10, opposite the inner surface 8. The support 2 comprises at least one groove 12 extending in a recessed manner from the outer surface 10. "Extending in a recessed manner from the outer surface 10" means that the groove 12 is recessed from the rest of the outer surface 10, as shown in the figures. The groove 12 extends around the periphery of the first part 6 of the support 2 and thus forms an edge of at least a portion of the first part 6. On the other side of the groove 12 from the first part 6, the support 2 comprises a second part 14. Thus, the groove 12 also forms an edge of at least a portion of the second part 14.

On the side of the outer surface 10, the groove 12 is delimited by a first wall 16, a second wall 18 and a bottom wall 20.

The first wall 16 extends from the outer surface 10 of the first part 6 towards the bottom wall 20 in a direction towards the inner surface 12 and forms a non-zero angle with the outer surface 10 of the first part 6. The angle formed between the first wall 16 and the outer surface 10 of the first part 6 is for example between 30° and 150°.

The second wall 18 extends from the outer surface 10 of the second part 14 towards the bottom wall 20 in a direction towards the inner surface 12 and forms a non-zero angle with the outer surface 10 of the second part 14. The angle formed between the second wall 18 and the outer surface 10 of the second part 14 is for example between 30° and 150°. The second wall 18 is, for example, substantially parallel to the first wall 16. Alternatively, the first wall 16 and the second wall 18 converge towards each other as they approach the bottom wall 20. This variant is more particularly applied when the support 2 is made of NFPP because of the material constraints related to thermocompression during the production of the support 2.

The bottom wall 20 extends between the first wall 16 and the second wall 18, at their ends away from the outer surface 10 of the first and second parts 6, 14. Thus, the groove 12 has a substantially U-shaped cross-section, the legs of the U being formed by the first and second walls 16, 18 and the base of the U being formed by the bottom wall 20. The groove 12 comprises an opening 22 opposite the bottom wall 20, the opening 22 thus extending between the outer surface 10 of the first part 6 and the outer surface 10 of the second part 14.

The width of the groove 12 is defined as the distance between the first wall 16 and the second wall 18. The width of the groove 12 is for example substantially comprised between 4.4 mm and 10 mm. It should be noted that, due to the constraints imposed by the support shaping tool 2, such as a pressing tool as described above, the width of the groove 12 cannot be less than 4.4 mm.

The first covering layer 4 extends over the first part 6 of the support 2. More particularly, the first covering layer 4 comprises an inner face 24, extending opposite the outer surface 10 of the first part 6 of the support 2, and an outer face 26 opposite the inner face 24 and forming a visible part of the trim element 1 from the passenger compartment of the vehicle in which the trim element 1 is installed. The inner face 24 is for example applied to the outer surface 10 of the first part 6. The thickness of the first covering layer is defined as the distance between the inner face 24 and the outer face 26. The thickness of the first covering layer 4 is for example substantially between 1 mm and 5 mm.

The first covering layer 4 comprises an edge 28 forming at least part of the periphery of the first covering layer 4 in the vicinity of the second portion 14. When the first covering layer 4 is fixed to the first part 6 of the support 2, the edge 28 extends into the groove 12 and is held there by a retention device 30, as will be described in more detail later. Thus, the edge 28 is defined as the portion of the first covering layer 4 that extends from the end portion of the first part 6 of the support 2 into the groove 12.

According to the embodiment shown in the figures, the first covering layer 4 comprises an appearance layer 32 and a backing layer 34. The appearance layer 32 forms the outer face 26 of the first covering layer 4 and extends over the backing layer 34 which forms the inner face 24 of the first covering layer 4 and is applied to the first part 6 of the support 2. The appearance layer 32 is formed, for example, by a skin of natural or synthetic material or by a textile material, depending on the desired appearance of the trim element 1 on the first part 6 of the support 2. The backing layer 34 is, for example, formed by a layer of foam arranged to give a soft feel to the trim element 1 facing the first part 6 of the support 2. According to this embodiment, the edge 28 of the first covering layer 4 can be compressed, in particular the foam layer, so that the thickness of the edge 28 can be reduced in comparison to the thickness of the rest of the first covering layer 4, as shown in the figures. It is understood that the first covering layer 4 may comprise more than two layers or be formed of only one layer, depending on the desired characteristics for the look and/or feel of the first covering layer 4. The thickness of the first covering layer 4 may or may not be constant, but the thickness of the edge 28 is less than the width of the groove 12, so that the edge 28 can be introduced into the groove 12 without particular difficulty.

According to the embodiment shown in the figures, the trim element 1 further comprises a second covering layer 36 extending over the second part 14 of the support 2. More particularly, the second covering layer 36 comprises an inner face 38, extending on the outer surface 10 of the second part of the support 14, and an outer face 40 opposite the inner face 38 and forming another visible part of the trim element 1 from the passenger compartment of the vehicle in which the trim element 1 is installed. The second covering layer 36 comprises an edge 42 forming at least part of the periphery of the second covering layer 36 in the vicinity of the first portion 6. When the second covering layer 36 is attached to the second part 14 of the support 2, the edge 42 extends into the groove 12. The thickness of the second covering layer 36, defined as the distance between the inner face 38 and the outer face 40 of the second covering layer 36, is such that the sum of the thickness of the first covering layer 4 and the thickness of the second covering layer, at the edges 28 and 42, is less than the width of the groove 12 as can be seen in the figures. More particularly, the thickness of the second covering layer 36 is for example less than the thickness of the first covering layer 4 and is for example between 0.2 mm and 1 mm.

The second covering layer 36 is, according to one embodiment, of a different nature than the first covering layer 4. "Different nature" means that the first covering layer 4 is made of one or more materials different from that or those of the second covering layer 36. The second covering layer 36 has, for example, a different look and/or feel than the first covering layer 4. The second covering layer 36 comprises, for example, a layer of wooden material so that the trim element 1 has a "wooden" appearance with respect to the second part 14 of the support 2. Alternatively, the second covering layer 36 may be formed by a decorative synthetic film or the like.

Alternatively, the second part 14 of the support 2 may be left "bare", i.e. without a covering layer on its outer face 10, so that the outer face 10 of the second part 14 of the support 2 forms a visible part of the trim element 1 from the passenger compartment of the vehicle in which the trim element 1 is installed.

The fixing of the first covering layer 4 and, if applicable, the second covering layer 36 will now be described according to different embodiments of the retention device 30 according to the invention.

The retention device 30 generally comprises a supporting element 44 extending at least partially into the groove 12 and arranged to locate the first covering layer 4 across the groove 12 so that the first covering layer 4 obscures the majority of the groove 12 when the edge 28 of the first covering layer 4 is received in the groove 12.

More particularly, when the edge 28 of the first covering layer 4 is received in the groove 12, the first covering layer 4 covers the transition between the outer face 10 of the first part 6 of the support 4 and the first wall 16 of the groove 12. The inner face 24 of the first covering layer 4 extends opposite the first wall 16 of the groove 12 and the outer face 26 of the first covering layer 4 extends opposite the second wall 18 of the groove 12. The supporting element 44 is then arranged to apply a portion of the outer face 26 of the edge 28 of the first covering layer 4 against the second wall 18 of the groove 12. The application of the first covering layer 4 takes place in particular in the vicinity of the opening 22 of the groove 12. In other words, due to the supporting element 44, the first covering layer 4 extends across the groove 12 from the transition between the outer surface 10 of the first part 6 to the second wall 18 of the groove 12 so that it covers the groove 12 and conceals it from the outside of the trim element. "Apply against" means direct contact between the outer face 26 of the edge 28 of the first covering layer and the second wall 18 of the groove 12 or indirect contact if an element is interposed between the outer face 26 of the edge 28 of the first covering layer 4 and the second wall 18 of the groove 12. Thus, it is understood that, when the trim element 1 comprises a second covering layer 36, the supporting element 44 applies the part of the outer face 26 of the edge 28 of the first covering layer 4 against the outer face 40 of the edge 42 of the second covering layer 36, the inner face 38 of which is applied to the second wall 18 of the groove 16, as shown in the figures.

The supporting element 44 comprises a support leg 46 extending in a direction from the first wall 16 to the second wall 18, the support leg 46 cooperating with the edge 28 of the first covering layer 4 so as to press the first covering layer 4 against the second wall 18 of the groove 12. The support leg 46 has, for example, a width, measured in the direction from the first wall 16 to the second wall 18, substantially between 2 mm and 8 mm and a thickness, for example, substantially equal to 1 mm.

The supporting element 44 further comprises, for example, an anchor leg 48 extending substantially parallel to the first and second walls 16, 18 of the groove 12, the anchor leg 48 being arranged to hold the edge 28 of the first covering layer 4 in the groove 12. The anchor leg 48 has, for example, a height, measured along its direction of extension substantially parallel to the first and second walls 16, 18 of the groove 12, substantially between 5 mm and 10 mm. The support leg 46 extends from one end of the anchor leg 48 in the direction from the first wall 16 to the second wall 18 in the vicinity of the opening 22 of the groove 12. The inner face 24 of the first covering layer 4 passes around the support leg 46 upstream of the end of the edge 28 which extends into the groove 12 so that a portion of the first covering layer 4 is deformed towards and abuts the second wall 18 of the groove when the edge 28 is inserted into the groove 12. The portion of the first covering layer 4 that extends between the portion abutting the second wall 18 and between the end of the edge 28 cooperates with the anchor leg 48 to hold the edge 28 in the groove 12, as will now be described. The supporting element 44 is for example made of a thermoplastic elastomer material.

Figure 2:
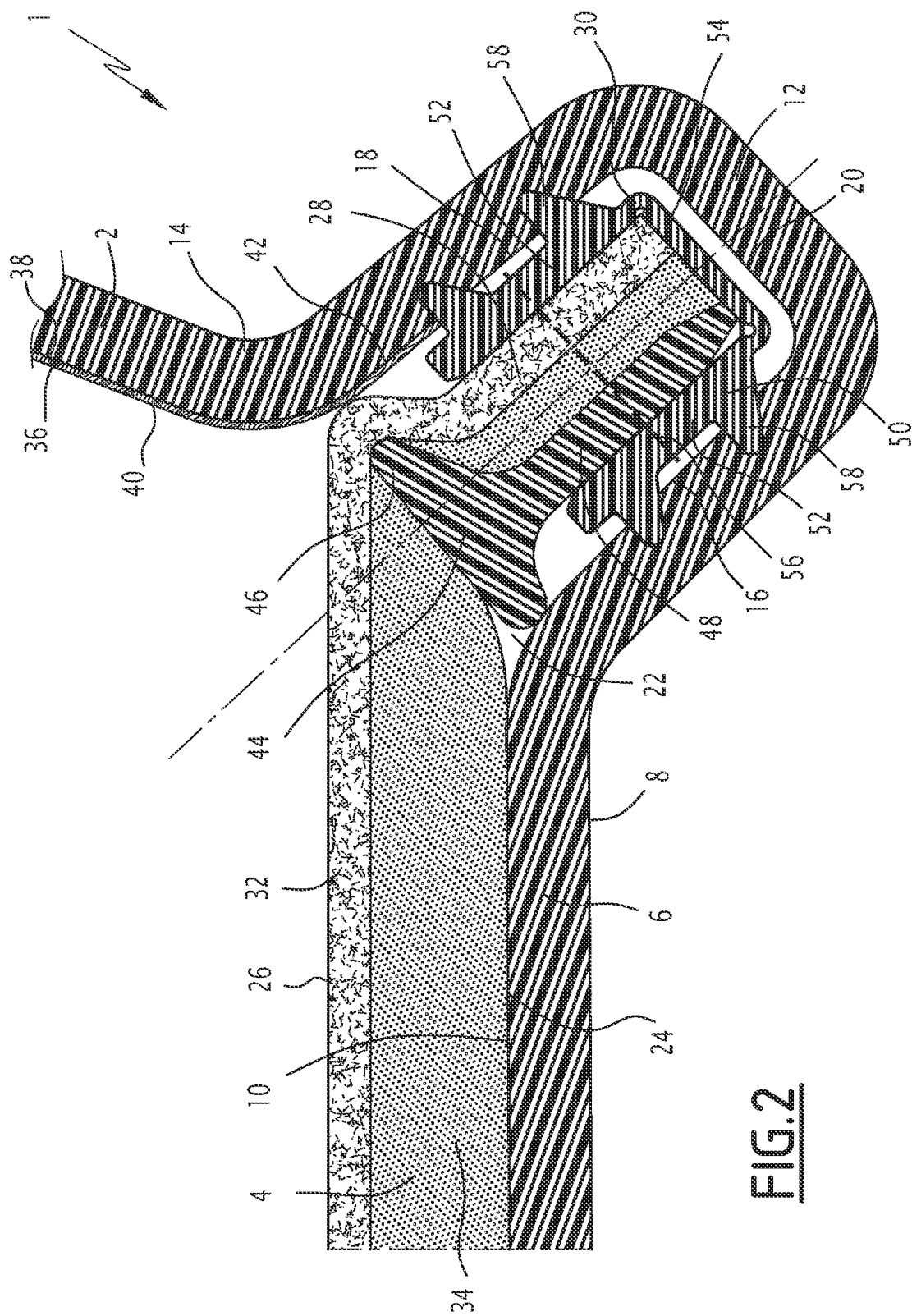
FIG. 2 is a schematic cross-sectional representation of a portion of a trim element according to a second embodiment of the invention.

In the embodiments shown in FIGS. 1 and 2, the retention device 30 further comprises a retention profile 50 separate from the supporting element 44. The retention profile 50 is arranged to receive the edge 28 of the first covering layer 4 and to cooperate with the groove 12 to retain the edge 28 in the groove 12, the edge 28 being retained in the retention profile by the anchor leg 48 of the retention element 44.

The retention profile 50 has a shape that is substantially complementary to that of the groove 12. Thus, the retention profile 50 has a U-shaped cross-section and defines a housing delimited by two side walls 52 and a bottom wall 54. The side walls 52 form the legs of the U and the bottom wall 54 forms the base of the U. The retention profile 50 is for example made of a thermoplastic elastomer material.

The edge 28 of the first covering layer 4 is received in the housing formed by the retention profile 50 and is held there by the anchor leg 48 of the supporting element 44.

Thus, according to the embodiment shown in FIG. 1, the edge 28 of the first covering layer 4 is folded around the anchor leg 48 and is inserted with the anchor leg 48 into the housing formed by the retention profile 50. The edge 28 is held in the housing by the force exerted by the anchor leg 48 on the edge 28, which presses the outer face 26 of the edge 28 against the side walls 52 of the retention profile 50, in particular due to the compression of the backing layer 34 of the first covering layer 4. This retention can be further ensured by a seam 56 between the edge 28, the supporting element 44 and the retention profile 50.

The embodiment of FIG. 2 is similar to that of FIG. 1 except that the edge 28 is not folded around the anchor leg 48. According to this embodiment, the thickness of the anchor leg 48 may be increased to fill the housing of the retention profile 50 in cooperation with the edge 28 of the first covering layer 4. Also in this embodiment, the anchor leg 48 may compress the backing layer 34 of the first covering layer 4 in order to forcefully hold the edge 28 in the housing of the retention profile 50. This retention can be further ensured by a seam 56 between the edge 28, the supporting element 44 and the retention profile 50.

The cooperation between the retention profile 50 and the groove 12 is achieved, for example, by forcing the retention profile 50, in which the edge 28 of the first covering layer 4 is held, and by pressing the side walls 52 of the profile against the first and second walls 16 and 18 of the groove 12. According to one embodiment, at least one rib 58 extends from one of the side walls 52 of the retention profile 50 outside the housing defined by this profile, between this side wall 52 and the wall of the corresponding groove 12, this rib 58 anchoring the retention profile 50 in the groove 12. Advantageously, as shown in the figures, ribs 58 are provided on the two side walls 52 of the profile 50 and cooperate with the first and second walls 16 and 18 of the groove 12 in order to secure the retention profile 50 in the groove 12. The width of the profile 50 before insertion into the groove 12 is for example greater than the width of the groove 12 so that the profile 50 is held in the groove 12 with force.

Figure 3:
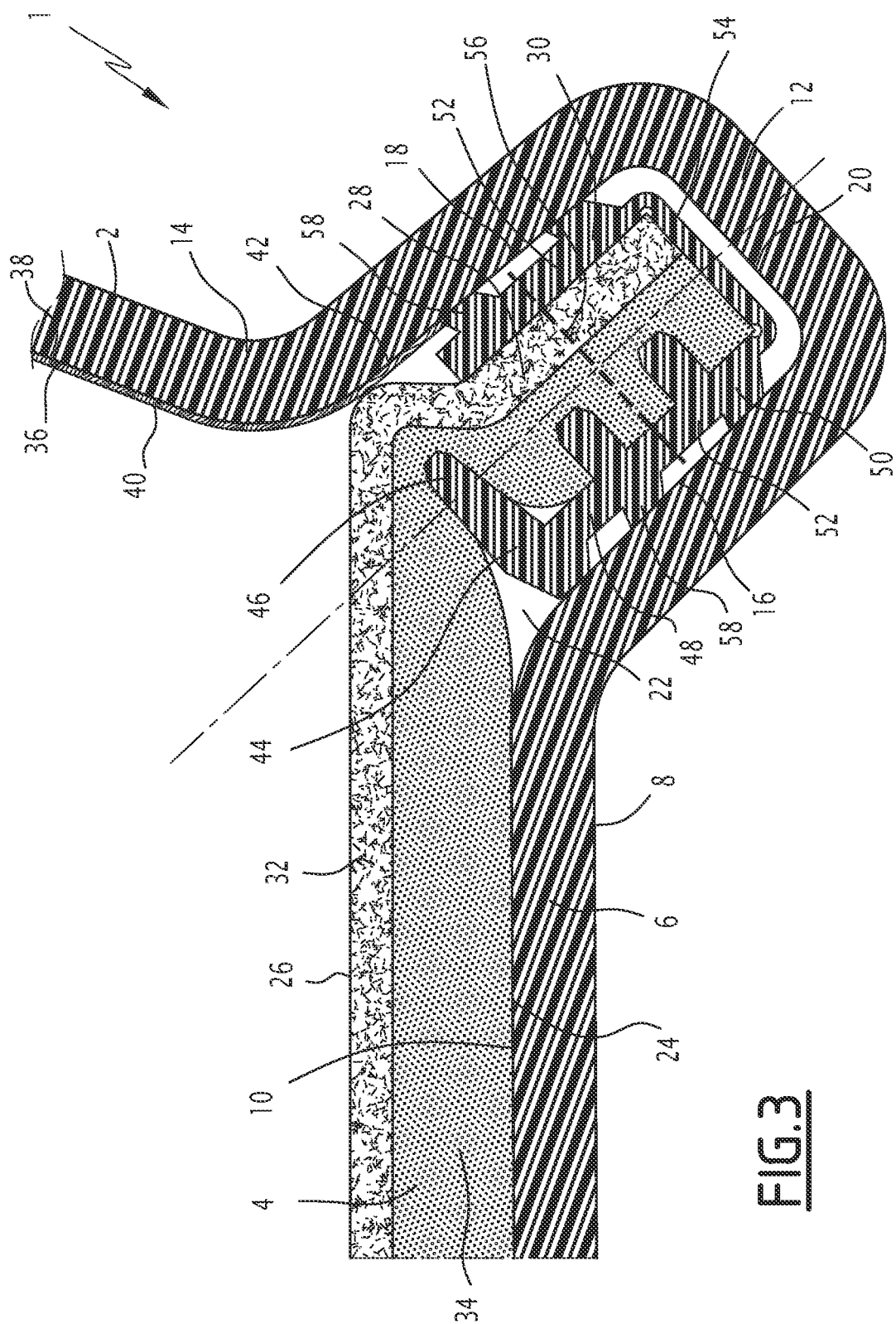
FIG. 3 is a schematic cross-sectional representation of a portion of a trim element according to a third embodiment of the invention.
Figure 4:
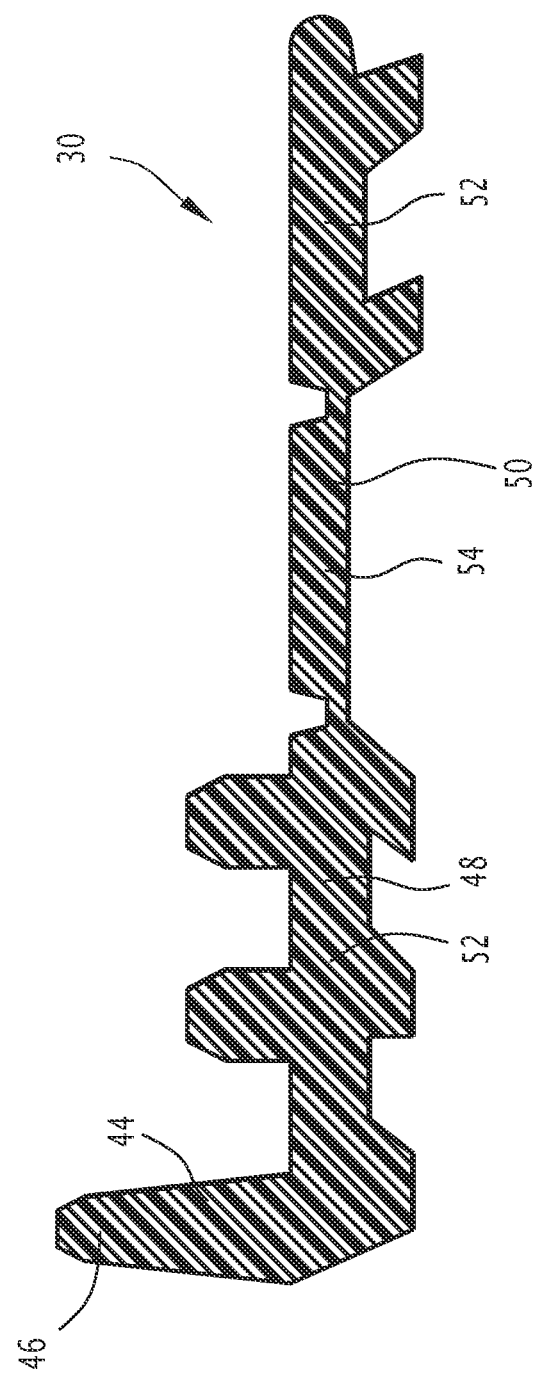
FIG. 4 is a schematic cross-sectional representation of the retention device of FIG. 3 in an unfolded state.
Figure 5:
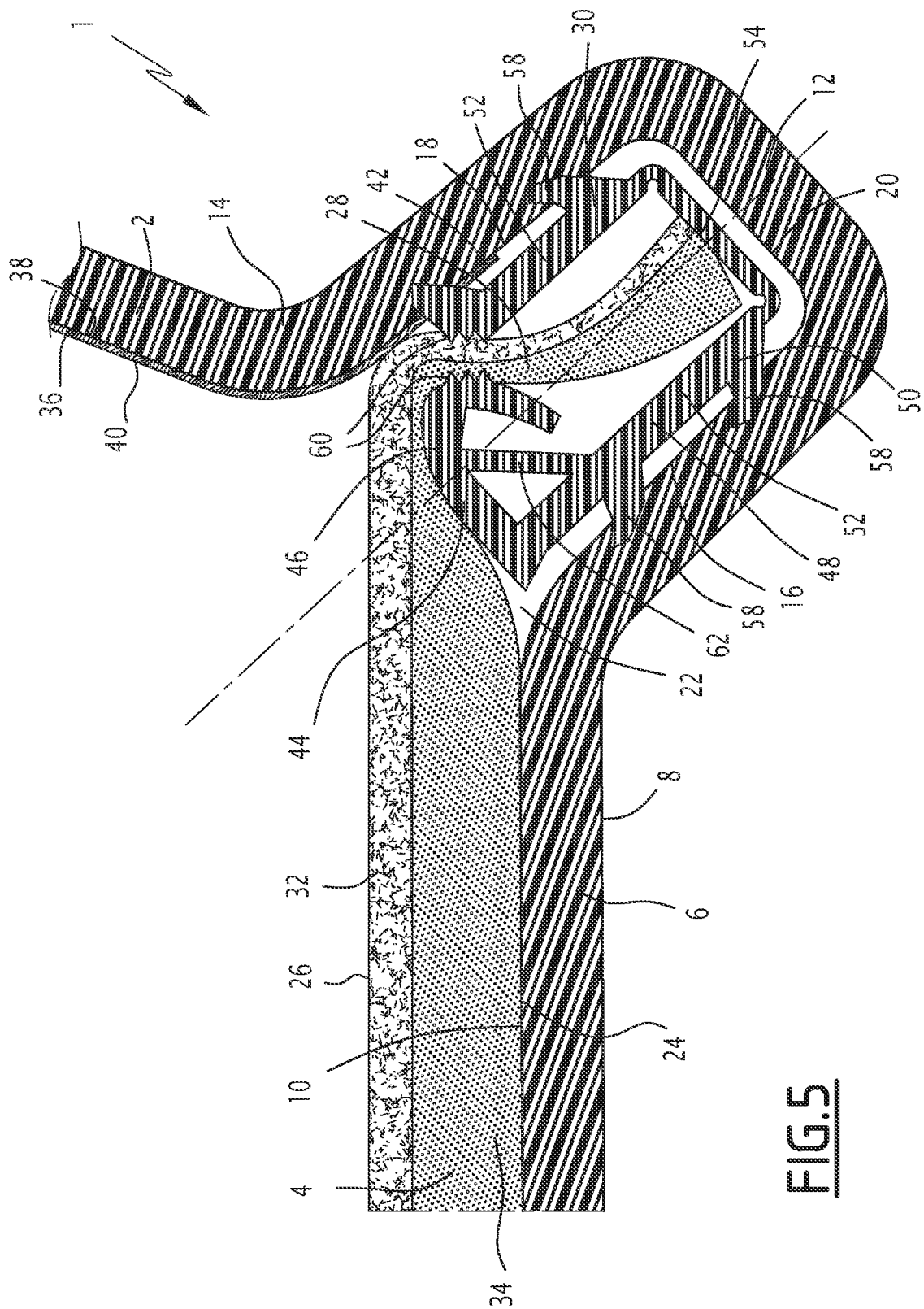
FIG. 5 is a schematic cross-sectional representation of a portion of a trim element according to a fourth embodiment of the invention.

The embodiments shown in FIGS. 3 to 5 are similar to the embodiments shown in FIGS. 1 and 2 apart from the fact that the supporting element 44 is part of the same piece as the retention profile 50. Thus, according to these embodiments, the anchor leg 48 of the supporting element 44 also forms one of the side walls 52 of the retention profile 50, namely the side wall 52 which is applied against the first wall 16 of the groove 12. The support leg 46 thus extends from the end of the side wall 52 forming the anchor leg 48 towards the second wall 18 of the groove 12 to apply the portion of the first covering layer 4 passing around the support leg 46 against the second wall 18 of the groove 12, as shown in the FIGS. 3 and 5.

In the embodiment shown in FIGS. 3 and 4, the one-piece retention device 30 is formed by a clip folded around the edge 28 of the first covering layer 4. Thus, the retention device 30 is made in an unfolded state, shown in FIG. 4, in which the side walls 52 extend in continuity with the bottom wall 54, and is then folded around the edge 28 of the first covering layer 4 by folding the side walls 52 around the bottom wall 54. Such a clip can be made in a simple way and is easily demoulded. The retention of the edge 28 in the housing formed by the retention profile 50 can be finalised by a seam 56 between the edge 28 and the retention profile 50.

In the embodiment shown in FIG. 5, the retention profile 50 is first placed in the groove 12 and the edge 28 of the first covering layer 4 is introduced into the recess formed by the profile 50 after the retention profile 50 has been placed in the groove 12. In this case, the support leg 46 defines a passage with the side wall 52, which is in contact with the second wall 18 of the groove 12, into which the edge 28 of the first covering layer 4 is introduced. Teeth 60 projecting into the passage from the support leg 46 and the side wall 52 retain the edge 28 in the housing formed by the retention profile 50. In this case, an additional seam is not necessary, which simplifies the assembly of the trim element. A reinforcing rib 62 may further be provided between the support leg 46 and the side wall 52 forming the anchor leg 48 to provide rigid support to the portion of the first covering layer 4 that extends over the opening 22 of the groove 12, as shown in FIG. 5.

The retention device 30 thus enables the first covering layer 4 to be arranged across the groove 12 so that it covers the opening 22 of the groove 12 from the first wall 16 to the second wall 18. The transition between the outer surface 26 of the first covering layer 4 and the outer surface 40 of the second covering layer 36 or the outer surface 10 of the second part 14 of the support 2 thus has an improved appearance. This is due in particular to the fact that the radius of curvature of the first covering layer 4 at the part which is applied against the second wall 18 of the groove 12 can be reduced, thanks to the supporting element 44. Thus, the radius of curvature of the outer surface 26 of the first covering layer 4 at the portion applied against the second wall 18 is for example substantially between 1 mm and 4 mm. Such a reduced radius of curvature reduces the depth of the transition between the first covering layer 4 and the second covering layer 36 or the second part 14 of the support 2, thereby improving the appearance thereof. Furthermore, the groove 12 is not visible from outside the trim element 1.

It is understood that the support 2 may comprise more than one groove 12, for example two grooves 12 for receiving two opposing edges 28 of the first covering layer 4, and more than two covering layers.

The invention claimed is:

1. A vehicle trim element comprising:
a support comprising at least one groove extending in a recessed manner from an outer surface of the support, said groove being bounded by a first wall and a second wall spaced from each other, and
at least one first covering layer comprising an inner face extending over a first part of said support and an outer face, opposite the inner face, said first covering layer comprising at least one edge defining a part of the periphery of the first covering layer, said edge being received in the groove of the support, the inner face of the edge of the first covering layer extending opposite the first wall of the groove and the outer face of the edge of the first covering layer extending opposite the second wall of the groove,
wherein the trim element further comprises a retention device for retaining the edge of the first covering layer in the groove of the support, said retention device comprising at least one supporting element extending at least partly into the groove and applying a part of the outer face of the edge of the first covering layer against the second wall of the groove, the first covering layer covering the groove from the first wall to the second wall,
wherein the first part of the support is adjacent to the first wall of the groove, the support comprising a second part adjacent to the second wall of the groove,
the trim element comprising a second covering layer, different in nature from the first covering layer, an inner face of said second covering layer extending over the second part of the support, the second covering layer comprising an edge defining a part of the periphery of the second covering layer, said edge being received in the groove, the inner face of the edge of the second covering layer extending over the second wall of the groove, the supporting element of the retention device applying a portion of the outer face of the edge of the first covering layer against an outer face of the edge of the second covering layer, opposite to the inner face of the second covering layer.

2. The trim element according to claim 1, wherein the sum of the thicknesses of the edges of the first covering layer and the second covering layer is smaller than the width of the groove.

3. The trim element according to claim 1, wherein the supporting element comprises an anchor leg extending substantially parallel to the first and second walls of the groove and being arranged to hold the edge of the first covering layer in said groove, the supporting element comprising a support leg extending from one end of said anchor leg in a direction from the first wall to the second wall of the groove, the first covering layer being folded around said support leg.

4. The trim element according to claim 3, wherein the edge of the first covering layer is folded around the anchor leg of the retention element.

5. The trim element according to claim 3, wherein the retention device further comprises a retention profile for retaining the edge of the first covering layer in the groove, said retention profile defining a housing delimited by two side walls applied respectively against the first wall and the second wall of the groove, the edge of the first covering layer being held in said housing.

6. The trim element according to claim 5, wherein the anchor leg is received in said housing and locks the edge of the first covering layer in said housing.

7. The trim element according to claim 5, wherein the side wall of the retention profile, which rests on the first wall of the groove, is formed by the anchor leg of the retention element, the retention profile and the retention element being portions of the same part.

8. The trim element according to claim 5, wherein at least one side wall of the retention profile comprises at least one rib extending from said side wall outside the housing between said side wall and the corresponding wall of the groove, said rib anchoring the retention profile in the groove.

9. A vehicle trim element comprising:
a support comprising at least one groove extending in a recessed manner from an outer surface of the support, said groove being bounded by a first wall and a second wall spaced from each other, and
at least one first covering layer comprising an inner face extending over a first part of said support and an outer face, opposite the inner face, said first covering layer comprising at least one edge defining a part of the periphery of the first covering layer, said edge being received in the groove of the support, the inner face of the edge of the first covering layer extending opposite the first wall of the groove and the outer face of the edge of the first covering layer extending opposite the second wall of the groove,
wherein the trim element further comprises a retention device for retaining the edge of the first covering layer in the groove of the support, said retention device comprising at least one supporting element extending at least partly into the groove and applying a part of the outer face of the edge of the first covering layer against the second wall of the groove, the first covering layer covering the groove from the first wall to the second wall,
wherein the supporting element comprises an anchor leg extending substantially parallel to the first and second walls of the groove and being arranged to hold the edge of the first covering layer in said groove, the supporting element comprising a support leg extending from one end of said anchor leg in a direction from the first wall to the second wall of the groove, the first covering layer being folded around said support leg.

10. The trim element according to claim 9, wherein the first part of the support is adjacent to the first wall of the groove, the support comprising a second part adjacent to the second wall of the groove.

11. The trim element according to claim 10, comprising a second covering layer, different in nature from the first covering layer, an inner face of said second covering layer extending over the second part of the support, the second covering layer comprising an edge defining a part of the periphery of the second covering layer, said edge being received in the groove, the inner face of the edge of the second covering layer extending over the second wall of the groove, the supporting element of the retention device applying a portion of the outer face of the edge of the first covering layer against an outer face of the edge of the second covering layer, opposite to the inner face of the second covering layer.

12. The trim element according to claim 11, wherein the sum of the thicknesses of the edges of the first covering layer and the second covering layer is smaller than the width of the groove.

13. The trim element according to claim 9, wherein the edge of the first covering layer is folded around the anchor leg of the retention element.

14. The trim element according to claim 9, wherein the retention device further comprises a retention profile for retaining the edge of the first covering layer in the groove, said retention profile defining a housing delimited by two side walls applied respectively against the first wall and the second wall of the groove, the edge of the first covering layer being held in said housing.

15. The trim element according to claim 14, wherein the anchor leg is received in said housing and locks the edge of the first covering layer in said housing.

16. The trim element according to claim 14, wherein the side wall of the retention profile, which rests on the first wall of the groove, is formed by the anchor leg of the retention element, the retention profile and the retention element being portions of the same part.

17. The trim element according to claim 14, wherein at least one side wall of the retention profile comprises at least one rib extending from said side wall outside the housing between said side wall and the corresponding wall of the groove, said rib anchoring the retention profile in the groove.

\* \* \* \* \*